United States Patent [19]  
Patton

[11] 4,383,067  
[45] May 10, 1983

[54] POLYMERS CHARACTERIZED BY 1,3-IMIDAZOLIDINE-1,3-DIYL RINGS PLASTICIZED WITH PHOSPHATE ESTERS

[75] Inventor: Tad L. Patton, Baytown, Tex.

[73] Assignee: Exxon Research & Engineering Co., Florham Park, N.J.

[21] Appl. No.: 288,244

[22] Filed: Jul. 29, 1981

[51] Int. Cl.$^3$ ............................................... C08K 5/52
[52] U.S. Cl. ................................... 524/141; 524/145; 524/143
[58] Field of Search .................. 260/30.6 R; 524/141, 524/145

[56] References Cited

U.S. PATENT DOCUMENTS

| | | | |
|---|---|---|---|
| 3,609,113 | 9/1971 | Schade et al. | 260/30.2 |
| 3,661,859 | 5/1972 | Patton | 525/418 |
| 3,901,847 | 8/1975 | Johnson et al. | 525/417 |
| 4,074,007 | 2/1978 | Gebauer et al. | 260/30.6 R |
| 4,096,130 | 6/1978 | Kraft | 260/30.6 R |
| 4,294,785 | 10/1981 | Patton | 260/30.6 R |

*Primary Examiner*—Joseph L. Schofer  
*Assistant Examiner*—N. Sarofim  
*Attorney, Agent, or Firm*—M. B. Kurtzman

[57] ABSTRACT

Normally intractable polymers of the structure:

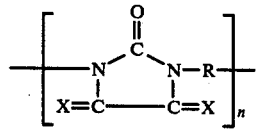

wherein X is O or NH, provided at least one X is O, such as poly(parabanic acids) are made extrudable by composition with greater than 15 to 60 weight percent of phosphate ester of the structure $(R_1-O)_3 P=O$ wherein $R_1$ is:

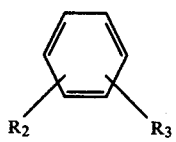

(a)

and each $R_2$ and $R_3$ is independently selected from H or —$CH_3$ or (b) an alkyl radical having 1 to 8 carbon atoms.

27 Claims, No Drawings

POLYMERS CHARACTERIZED BY 1,3-IMIDAZOLIDINE-1,3-DIYL RINGS PLASTICIZED WITH PHOSPHATE ESTERS

BACKGROUND OF THE INVENTION

1. Field of the Invention

The present invention relates to the discovery of a specific class of plasticizers for poly(iminoimidazolidinediones) and poly(parabanic acid) resins.

2. Related Art

Both the poly(iminoimidazolidinediones) and poly(parabanic acids) and their method of preparation are known and described in detail in commonly assigned U.S. Pat. No. 3,661,859, which is incorporated in its entirety herein. The poly(parabanic acids) may also be prepared by other processes, such as shown in U.S. Pat. No. 3,609,113.

The poly(iminoimidazolidinediones) may be formed by the reaction of hydrogen cyanide with a diisocyanate or mixture of diisocynates, the reaction of a dicyanoformamide with a diisocyanate or mixtures of diisocyanates, or the polymerization of a cyanoformamidyl isocyanate and contain a 1,3-imidazolidinedione-1,3-diyl ring of the following structures in the repeat units:

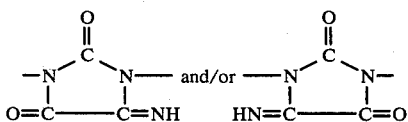

wherein NH is in the 4 or 5 position.

The poly(parabanic acids) also designated as poly(1,3-imidazolidine-2,4,5-triones) may be prepared, for example, by the acid hydrolysis of poly(iminoimidazolidinediones) and contain the imidazolidinetrione ring in the repeat unit:

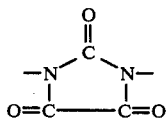

U.S. Pat. No. 3,609,113 and German Pat. No. 1,770,146 describe other methods for preparing polymers which contain the poly(parabanic acid) ring.

The polymers may contain both imino-1,3-imidazolidinedione-1,3-diyl rings and imidazolidinetrione rings, thus the present polymers may be broadly characterized as having the repeating unit:

wherein Q is

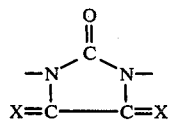

wherein X is O or NH, provided that at least one X is O, R is an organic moiety which may be aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc.) should not be present. Specific diisocyanates which may be used are set out in U.S. Pat. No. 3,661,859, other patents, articles or organic textbooks as known in the art.

Some of the parabanic acid polymers have been found to have high glass transition temperatures, and thus are especially suitable as magnetic tapes (where good dimensional stability at high temperatures is required), films for use in flexible printed circuits, cable wraps, etc., for fibers such as tire cord fibers (where tensile strength and modulus are required), for moldings for electrical connectors, bearings, magnetic wire insulation, coatings for cables, cookware, glass fabrics, industrial belts (where high temperatures are required) and the like.

However, many of the present polymers decompose when they are heated at or above their glass transition temperatures and as a result they can not be molded or extruded. Previously these polymers could be processed only by solution methods or by a powder coating technique which also requires a solvent.

It is an advantage of the compositions of the present invention that the poly(iminoimidazolidinediones), poly(imidazolidine-2,4,5-triones) or mixed poly(iminoimidazolidine-1,3-dione/imidazolidine-2,4,5-triones) or as defined above the polymers $+Q-R+_n$ may be processed by extrusion and molding techniques, when plasticized according to the present invention. Also films of the compositions of the present invention can be heat-sealed whereas films of the same pure polymers cannot be sealed with heat.

U.S. Pat. No. 3,901,847 commonly assigned discloses that poly(parabanic acids) may contain small amounts, i.e., 2.5 to 15 weight % of specific phosphonates and phosphates, particularly the halogenated analogues of these compounds as flame retardants. There is a broad disclosure of aryl phosphates, however, the only unhalogenated aryl phosphate evaluated was tris(biphenyl)phosphate. The other data was developed for halogenated phosphates and polyphosphates. Some of the materials actually evaluated by the patentee embrittled the polymers, even at the low levels employed.

According to the present invention a specific class of organic phosphates at high concentrations have been found to be compatible with the poly(parabanic acids) and in fact the present organic phosphates are plasticizers for the polymers and exhibit a quite opposite effect to the embrittlement which is an apparent effect of some organic phosphates evaluated in U.S. Pat. No. 3,901,847.

Japanese application No. 53045-355, filed Oct. 7, 1976 (TOA NENRYO KOGYO K.K.) also discloses polymeric phosphates as flame retardants in amounts of 1–20 parts by weight.

SUMMARY OF THE INVENTION

Briefly, the present invention is a stable meltable composition comprising heterocyclic polymers characterized in the repeating unit by the tri-substituted 1,3-imidazolidine-1,3-diyl ring:

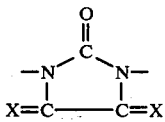

wherein X=O or NH, provided at least one X is O or more specially polymers having the repeating unit:

wherein Q is

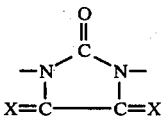

and X has the significance set out above, R is an organic moiety which may be aliphatic, alicyclic, aromatic or mixtures thereof and n is sufficiently large to produce a solid product and a plasticizing amount of unhalogenated organic phosphate ester of the structure:

$(R_1-O)_3 P=O$ wherein $R_1$ is:

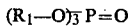
(a)

and each of $R_2$ and $R_3$ is independently selected from H or —$CH_3$, or (b) an alkyl radical having 1 to 4 carbon atoms preferably 1 to 2 carbon atoms.

More particularly, the polymers may be poly(iminoimidazolidinediones) characterized by a tri-substituted 1,3-imidazolidine-1,3-diyl ring of the following structure:

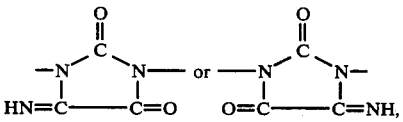

poly(parabanic acids) characterized by a tri-substituted 1,3-imidazolidine-1,3-diyl ring of the following structure:

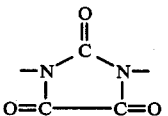

or more specifically, polymers of the general structure:

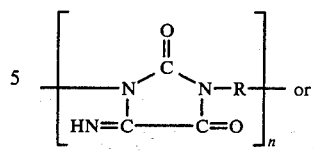

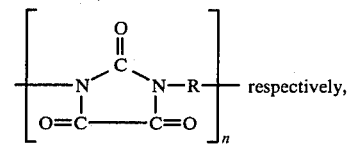

wherein R and n have the significance given above.

Some preferred R groups are methylenediphenyl, oxidiphenyl, a mixture of methylenediphenyl and 2,4-tolyenediyl, and a mixture of methylenediphenyl and bitolyenediyl.

The plasticized compositions of the present invention are capable of being melted without decomposition. The polymers may be films, powders or the like.

The term "plasticizing amounts" as used herein means that amount of designated phosphates, (1) greater than 15 weight percent to about 60 weight percent which is incorporated in and compatible with the polymer to form a homogeneous composition or (2) which is applied on a surface of the polymer and which will allow the polymer to melt without decomposition. Generally, the plasticizer incorporated into the polymer will comprise from 16 to 50 weight percent of the total weight of polymer and plasticizer. These compositions may be further characterized as "extrudable." Films of these compositions can be sealed by heating.

DETAILED DESCRIPTION OF THE INVENTION

It was found that conventional plasticizers such as mixtures of N-ethyl-o-toluene sulfonamide and N-ethyl-p toluene sulfonamide and mixtures of o-toluene sulfonamide and p-toluene sulfonamide were not useful for plasticizing the present polymers. Generally, the compositions containing these plasticizers melted but were subject to decomposition at the temperatures required to melt the blends if normal mixing procedures were used, i.e., adequate blending time of the polymer and plasticizer. Those blends which were melted in small batches for only a few minutes exhibited poor thermal stability when heating and mixing were continued.

These problems are substantially overcome by the use of the specified phosphate esters as plasticizers according to the present invention. The numerous references in the prior art to the use of phosphate esters as plasticizers, e.g., Encyclopedia of Polymer Science & Technology, Vol. 10 pp. 228 et seq. Wiley-Interscience, NY 1969 are of little value since it is well recognized that because of structural differences among resins, a plasticizer for one resin may not be compatible with another resin and may have little or no plasticizing effect on it.

Illustrative plasticizers according to the present invention are triphenyl phosphate, tricresyl phosphate, trixylenyl phosphate, trimethyl phosphate, triethyl phosphate, tripropyl phosphate, tributyl phosphate, tripentyl phosphate, trihexyl phosphate, triheptyl phosphate and trioctyl phosphate.

Triphenyl phosphate, tricresyl phosphate, trixylenyl phosphate and triethyl phosphate form a preferred grouping with the triaryl phosphates recited forming a particularly desirable group of plasticizers for the present invention.

It has been observed that an increase in the size of the alkyl groups present in the phosphates tends to reduce the compatibility of the polymer and plasticizer. Hence those defined phosphates having larger alkyl content would generally be less effecient plasticizers than the triaryl phosphates. Determination of the optimum amount of any defined plasticizer for a given defined polymer requires only routine compounding in accordance with the direction provided herein.

The presence of a plasticizer in the polymers described herein will, as is the known effect of plasticizers, result in different film properties at elevated temperatures, compared to unplasticized polymer film, that is, polymer films not containing plasticizer. Generally, plasticizers incorporated in the polymer will produce lower softening points than the polymer without the plasticizer incorporated therein.

The plasticized polymer is thus desirably softened at high temperatures so that films of these compositions may be sealed by heat. In the case of the present polymers which have high glass transition temperatures it may not always be desirable to give up the high temperature properties. For example, a cast film is just as easily produced without plasticizers, and may be more easily produced without plasticizers, if solvent removal is hampered by film sag or melting during solvent evaporation.

Films of the present unplasticized polymers are however difficult to heat seal because of their very high softening temperatures, because the polymer does not flow enough to coalesce into a single phase. Moreover, other materials employed in conjunction with the polymer may be damaged by the high temperature required to seal the unplasticized polymer.

Accordingly it has been found that application of a plasticizer described herein as a thin coating to the surface of the unplasticized polymer, such as a film, results in the lowering of the softening point of the treated surface of the polymer to such as degree as to make the film heat sealable. For example, the treated surface may be applied to an untreated surface of the same or different polymeric material and laminated thereto by heat and pressure. This method of heat sealing has a definite advantage over the use of lower melting adhesives, since the melting point of the adhesive may limit the maximum use temperature of the film. This method of heat sealing is also superior to that wherein the plasticizer is distributed throughout the film because less plasticizer per pound of polymer is required and the heat sealed product will retain its mechanical properties at higher temperatures.

Only one surface of a film to be heat sealed need have the plasticizer applied, that is the surface which is to be contacted with another surface must have the plasticizer thereon, however if a coated surface of the present polymer film were placed in contact with the uncoated surface of another film of the present polymer or with its own uncoated surface (as in cable wrapping) the softening point of the polymer in both film surfaces is reduced. The sealing is preferably accomplished by heat and pressure, such that the polymer on both surfaces contacts the plasticizer so that they both soften and coalesce into a single film. Thus, the two films would be joined by fusion. This same procedure has been used to join polymer film to other materials such as copper foil. The thin coating of plasticizer may be applied neat or from a solution of it to the surface to be sealed. The coating is preferably less than 15 mil, more preferably about 0.1 mil thick. Generally, the thickness of such coating will be in the range of about 0.01 to 0.5 mil.

The solution method of applying the coating of plasticizer employs as a solvent any suitable volatile liquid which dissolves the present plasticizer and which does not affect the present polymers. For example, suitable solvents include low molecular weight alkanols having about 1 to 6 carbon atoms, low molecular weight ketones having about 3 to 6 carbon atoms, $C_5$ to $C_7$ alkane hydrocarbons, aromatic hydrocarbons having 6 to 8 carbon atoms, halogenated analogues of the above and the like. Such compounds as would be suitable are methanol, ethanol, propanol, 2-butanol, tertiary butanol, 2-3,dimethyl 2-butanol, 2 methyl 2-butanol, amyl alcohol, acetone, methyl ethyl ketone, methyl propyl ketone, butyl methyl ketone, 2-methyl-4-pentanone, methyl acetate, ethyl acetate, isobutyl acetate, isobutyl formate, isopropyl formate, ethyl propionate, isopropyl propionate, pentane, hexane, heptane, toluene, benzene, xylene, naptha, chloroform, carbon tetrachloride, butyl chloride, methylene dichloride, and ethyl bromide.

Within the very wide range of useful solvents disclosed, those having a boiling point in the range of 30° to 126° C. are preferred.

The plasticizer is employed in the solvent based on total weight of solvent and plasticizer in an amount in the range of 1 to 90 weight percent and more preferably from 5 to 50 weight percent. The solvent-plasticizer composition is applied to a film by coating it on the desired portion of the film and evaporating the solvent and heating the film to a temperature of 100° to 200° C. (several seconds to 5 minutes). The resultant coated film is not tacky at room temperature and has substantially the same properties as uncoated film, except for the added property of heat sealability.

To form a heat sealed bond between the present polymer film bearing the coating of plasticizer and itself or a similar film or some other object, the coated surface is applied against the surface to be joined thereto and heat and pressure applied to form the bond.

Generally temperatures in the range of 200° to 300° C. are employed for forming heat seals and more preferably temperatures in the range of 240° to 275° C. are used. Preferably, pressure is applied in conjunction with heat to facilitate the coalescing of the films. Usually pressures in the range of 1 to 100 psig are used. Conveniently, the pressure is applied by nip rolls, platens or any other conventional means of applying pressure such as the tightness of the film layers in a wrapped wire.

The amount of plasticizer applied by coating as described is generally about 1 to 10 weight percent of the film onto which it is coated, but may be as little as 0.1 weight percent thereof and obtain the described heat sealing or as much as 25 weight percent without detriment. The relative weight of plasticizer to the film is determined in regard to the entire film thickness in the area covered by the plasticizer.

The polymer with plasticizer incorporated therein according to the present invention may be extruded without degradation. The extrusions may be carried out at temperatures in the range of 250° to 330° C. The extrudates of the invention compositions were tough, smooth, clear and yellow to amber colored.

ILLUSTRATIVE PREFERRED EMBODIMENTS

For purposes of illustration, but not for exclusion, the majority of the examples illustrating the invention will be described in specific with respect to a particular polymer. That is, a polyparabanic acid prepared from diphenylmethane diisocyanate in accordance with proprietary techniques well described in patents assigned to Exxon Research and Engineering Company to result in a high performance polymer having the repeating unit shown below:

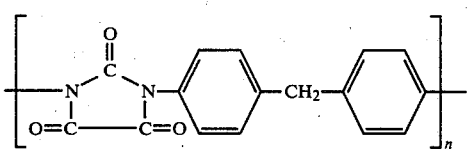

which is also designated as poly[1,4-phenylenemethylene-1,4-phenylene-1,3-(imidazolidine-2,4,5-triones)] which is also designated in Chemical Abstracts as poly[(2,4,5-trioxo-1,3 imidazolidinediyl)-1,4-phenylenemethylene-1,4-phenylene]. It has a glass transition temperature greater than 275° C. and can not be extruded or molded.

For purposes of convenience, this polymer species will be referred to as PPA-M. It will be recognized that other polyparabanic acids (PPA) and their precursors (PIPA) can be prepared from other monomers so that the diphenyl methane group will be replaced by other organic moieties.

In general, the preferred polymers of the polymer-plasticizer compositions are those which have sufficient repeating units at room temperatures to be solids.

In addition to the polymer and plasticizers, it is contemplated that other appropriate additives which are not detrimental to the compositions such as those employed to stabilize against oxidation or ultraviolet light, flame retardants, pigments, fillers and the like may be present.

The following examples illustrate the present invention and should not be construed as limiting the scope thereof:

EXAMPLES

PPA-M would not melt and could not be extruded under the conditions used in the following examples.

A Brabender extruder on a Plasticorder Prep Center was used for all extrusions. The barrel was ¾ inch in diameter with an L/D ratio of 20:1 and was fitted with a ⅛ inch heated rod die. The barrel was heated in two zones. The screw had 10 flights feed, 5 flights compression, and 5 flights metering; the compression ratio was 3:1. The temperatures of the zones and the screw speed are recorded in the examples.

The inherent viscosities were determined at 25° C. using a concentration of 0.5 g. polymer in 100 ml. solution using dimethylformamide as the solvent. The inherent viscosities of plasticized polymer were corrected for the quantity of plasticizer present.

All polymer powders used in these examples were dry.

EXAMPLE 1

A dry blend of 50 g. (20 wt.%) of tricresyl phosphate (Kronitex*-TCP) in 200 g. PPA-M was extruded using a screw speed of 25 rpm; the heating profile was zone 1, 300° C.; zone 2, 280°; and zone 3 (die), 280° C. The extrudate was milled to a fine powder. It was soluble in dimethylformamide and had an inherent viscosity of 0.94 which was slightly less than it was before extrusion (1.1).

*Tradename of FMC Corporation

EXAMPLE 2

The procedure was the same as Example 1 except the plasticizer was trixylenyl phosphate (Kronitex TXP). The extrudate was much rougher than the extrudate in Example 1. The extrudate was soluble in dimethylformamide and had an inherent viscosity of 1.00 which indicated less molecular weight degradation occurred than in example 1.

EXAMPLE 3

The procedure was like Example 1 except the plasticizer was triphenyl phosphate. The extrudate was clear and tough. It had an inherent viscosity of 1.05 which indicated that very little molecular weight degradation occurred during extrusion.

EXAMPLE 4

A blend of 50 g. of triphenyl phosphate in 200 g. PPA-M was extruded. All heating zones were heated to 300° C. The screw speed was 20 rpm. The product extruded as a clear light yellow colored rod.

EXAMPLE 5

This example demonstrates the effect of the concentration of triethyl phosphate in PPA-M on the temperature required to melt the mixture. Blends of triethyl phosphate in PPA-M were prepared and then mixed in the Plasticorder mixing head using a rotor speed of 40 rpm. The temperature of the mixing head was adjusted to determine the temperature required to melt polymer mixtures. The results are tabulated below:

| Concentration of Triethyl phosphate in PPA-M | Temperatures Required to Melt the Mixtures |
| --- | --- |
| 40% | 220° C. |
| 30% | 230° C. |
| 20% | 260° C. |

EXAMPLE 6

This example demonstrates that the presence of triaryl phosphates in films of PPA-M lower the softening point of the polymer so that they can be heat sealed themselves. A film of the virgin resin can not be heat sealed to itself.

The films were cast from dimethylformamide solutions which contained 200 g. of a triaryl phosphate (16.6 wt.%) per 1000 g. of PPA-M. Strips (⅜ inch wide) of the films were wrapped around ¼ inch diameter copper tubing with a 50% overlap. They were then heated in a 260° C. oven for 5 minutes. When cooled the films which contained triphenyl phosphate and trixylenyl phosphate could not be unwrapped. They heat sealed but did not adhere to the copper substrate.

No embrittlement of the plasticized PPA-M was observed in any of the examples.

The invention claimed is:

1. A stable meltable composition comprising heterocyclic polymers characterized in the repeating units by the tri-substituted 1,3-imidazolidine-1,3-diyl ring:

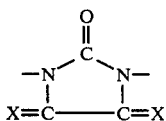

wherein X=O or NH, provided at least one X is O and a plasticizing amount greater than 15 wt.% to about 60 wt% of unhalogenated organic phosphate esters of the structure: $(R_1-O)_3 P=O$ wherein $R_1$ is:

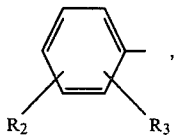
(a)

and each of $R_2$ and $R_3$ is independently selected from H or —$CH_3$ or (b) an alkyl radical having 1 to 4 carbon atoms.

2. A stable meltable composition comprising heterocyclic polymers having the repeating unit: $+Q-R+_n$ wherein Q is

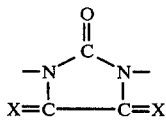

X=O or NH, provided at least one X is O, R is an organic moiety which may be aliphatic, alicyclic, aromatic or mixtures thereof and n is sufficiently large to produce a solid product and a plasticizing amount greater than 15 wt% to about 60 wt% of unhalogenated organic phosphate esters of the structure: $(R_1-O)_3 P=O$ wherein $R_1$ is:

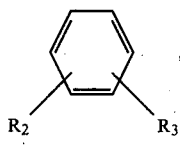
(a)

and each of $R_2$ and $R_3$ is independently selected from H or —$CH_3$ or (b) an alkyl radical having 1 to 4 carbon atoms.

3. The stable meltable composition according to claim 2 wherein from 16 to 50 weight percent of plasticizer is present.

4. The stable meltable composition according to claim 1 or 3 wherein said phosphate ester has the structure:

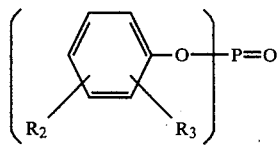

5. The stable meltable composition according to claim 3 wherein the plasticizer is triphenyl phosphate.

6. The stable meltable composition according to claim 3 wherein the plasticizer is tricresyl phosphate.

7. The stable meltable composition according to claim 3 wherein the plasticizer is trixylenyl phosphate.

8. The stable meltable composition according to claim 3 wherein the plasticizer is triethyl phosphate.

9. The stable meltable composition according to claim 1 or 4 wherein the plasticizer has the structure $(R_1-O)_3 P=O$ wherein $R_1$ is an alkyl radical having 1 to 8 carbon atoms.

10. The stable meltable composition according to claim 3 wherein the plasticizer is trimethyl phosphate.

11. The stable meltable composition according to claim 3 wherein the plasticizer is triethyl phosphate.

12. The stable meltable composition according to claim 3 wherein the plasticizer is tripropyl phosphate.

13. The stable meltable composition according to claim 3 wherein the plasticizer is tributyl phosphate.

14. The stable meltable composition according to claim 2 wherein the polymer has the structure:

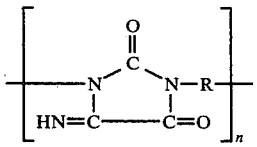

15. The stable meltable composition according to claim 2 wherein the polymer has the structure:

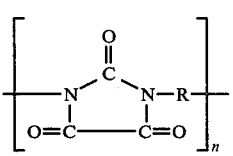

16. The stable meltable composition according to claim 15 wherein the R group is methylenediphenyl.

17. The stable meltable composition according to claim 15 wherein the R group is oxydiphenyl.

18. The stable meltable composition according to claim 15 wherein the R group is a mixture of methylenediphenyl and 2,4-toluenediyl groups.

19. The stable meltable composition according to claim 15 wherein the R group is a mixture of methylenediphenyl and bitolylenediyl groups.

20. The stable meltable composition of either claim 14 or 15 wherein said plasticizer is incorporated into said polymer.

21. The stable meltable composition according to claim 20 wherein said polymer is a film.

22. The meltable composition of either claim 14 or 15 wherein said plasticizer is coated onto a surface of said polymer.

23. The stable meltable composition according to claim 22 wherein said polymer is a film.

24. The stable meltable composition according to claim 23 wherein said plasticizer is coated in a thickness of from about 0.01 to 0.5 mil.

25. The stable meltable composition according to claim 3 wherein said plasticizer is incorporated into said polymer.

26. The stable meltable composition according to claim 20 wherein said polymer is a powder.

27. The stable meltable composition according to claim 9 wherein the alkyl radical has 1 to 2 carbon atoms.

* * * * *